(12) United States Patent
Arora et al.

(10) Patent No.: US 9,058,398 B2
(45) Date of Patent: Jun. 16, 2015

(54) MANAGING USE OF A SHARED CONTENT CONSUMPTION DEVICE

(71) Applicant: Audible, Inc., Newark, NJ (US)

(72) Inventors: Ajay Arora, New York, NY (US);
Douglas S. Goldstein, Riverdale, NY (US); Shirley C. Yang, New York, NY (US); Douglas C. Hwang, New York, NY (US); Guy A. Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 187 days.

(21) Appl. No.: 13/662,354

(22) Filed: Oct. 26, 2012

(65) Prior Publication Data

US 2014/0122564 A1 May 1, 2014

(51) Int. Cl.
| | | |
|---|---|---|
| G06F 17/30 | (2006.01) | |
| H04N 21/442 | (2011.01) | |
| H04L 29/06 | (2006.01) | |
| H04W 4/02 | (2009.01) | |
| H04N 21/422 | (2011.01) | |
| H04N 21/458 | (2011.01) | |
| H04N 21/4627 | (2011.01) | |
| H04N 21/475 | (2011.01) | |

(52) U.S. Cl.
CPC .... *G06F 17/30884* (2013.01); *H04N 21/44222* (2013.01); *G06F 17/30867* (2013.01); *H04L 65/60* (2013.01); *H04L 65/4084* (2013.01); *H04W 4/021* (2013.01); *H04N 21/42201* (2013.01); *H04N 21/44204* (2013.01); *H04N 21/44218* (2013.01); *H04N 21/4583* (2013.01); *H04N 21/4627* (2013.01); *H04N 21/4751* (2013.01)

(58) Field of Classification Search
CPC ... H04L 65/60; H04L 65/403; H04L 65/4084; H04L 65/1069; H04L 65/1083; G06F 17/30884; G06F 17/30867; G06F 17/30017; H04N 21/21805; H04N 21/25875; H04N 21/242
USPC .................. 709/203, 206, 217, 223
See application file for complete search history.

(56) References Cited

U.S. PATENT DOCUMENTS

| | | | |
|---|---|---|---|
| 8,296,261 B2* | 10/2012 | Pomerantz | 707/620 |
| 2003/0009521 A1* | 1/2003 | Cragun | 709/205 |
| 2004/0252400 A1* | 12/2004 | Blank et al. | 360/70 |
| 2007/0203955 A1* | 8/2007 | Pomerantz | 707/201 |
| 2008/0040313 A1* | 2/2008 | Schachter | 707/2 |
| 2008/0301222 A1* | 12/2008 | Schneider | 709/203 |
| 2009/0003265 A1* | 1/2009 | Agarwal et al. | 370/328 |
| 2009/0119108 A1* | 5/2009 | Noh et al. | 704/260 |
| 2009/0228569 A1* | 9/2009 | Kalmanje et al. | 709/217 |
| 2009/0249222 A1 | 10/2009 | Schmidt et al. | |
| 2010/0027966 A1* | 2/2010 | Harrang et al. | 725/116 |

(Continued)

*Primary Examiner* — Ramy M Osman
(74) *Attorney, Agent, or Firm* — Knobbe, Martens, Olson & Bear, LLP (57) ABSTRACT

Features are disclosed for identifying multiple users contending for use of a shared media device with which to present a content item. Users may be detected by the shared media device or a management component, and each user may have previously begun and stopped consumption at a different point within the content item. When multiple users wish to consume the content, a component or module determines which presentation position to use, or creates a new presentation position for use. In cases in which not all users have begun consuming or wish to consume the same content item, a component or module determines which content item to present.

30 Claims, 5 Drawing Sheets

(56) References Cited

U.S. PATENT DOCUMENTS

| | | |
|---|---|---|
| 2010/0082489 A1 | 4/2010 | Lin et al. |
| 2011/0106375 A1* | 5/2011 | Gurusamy Sundaram ..... 701/33 |
| 2011/0314008 A1* | 12/2011 | Badros et al. ................ 715/206 |
| 2012/0151015 A1 | 6/2012 | Plastina et al. |
| 2012/0210203 A1 | 8/2012 | Kandekar et al. |
| 2012/0257766 A1* | 10/2012 | Seymour et al. ................ 381/86 |
| 2013/0031192 A1* | 1/2013 | Caspi ........................... 709/206 |
| 2013/0060634 A1* | 3/2013 | Corson et al. .............. 705/14.58 |

* cited by examiner

MANAGING USE OF A SHARED CONTENT CONSUMPTION DEVICE

BACKGROUND

Electronic devices may be used to consume content, such as audio books, electronic books, television shows, movies, and music. In a common application, a user may obtain an audio book. The user may listen to the audio book on a personal device such as a mobile phone, or on a shared device such as a home entertainment system. A personal device can be used to listen to the audio book while a user of the device is travelling. Personal devices, while mobile and efficient, may have limited functionality and content consumption capabilities, including small or low resolution displays, low quality speakers, and limited computing power. Purpose-built media devices, such as televisions, stereos, video game systems, and desktop computers provide rich content consumption experiences. The media devices can have large high definition displays, high fidelity audio processing equipment and speakers, and large amounts of computing power. In addition, many media devices (and some personal devices) can be shared among multiple users.

For lengthy content items (e.g.: audio books), a user typically does not consume the entire content item in a single consumption session or even a small number of sessions. Devices can store data regarding the position within the content item at which presentation of the content item stopped so that the user may resume consumption of the content from where the user left off. In addition, the data regarding the presentation position may be synchronized or otherwise made available to other devices, so that the user may resume consumption on one device from where the user left on a different device.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Generally described, the present disclosure relates to managing shared content consumption resources. Aspects of the disclosure will be described with respect to identifying a user wishing to use a shared media device to present a content item. The content may include, but is not limited to, an audio book, e-book, television show, movie, game, or some other electronic content item. In some embodiments, users may be detected via voice recognition, entry of a password, wireless communication personal devices associated with the users, facial recognition, and the like. Each of multiple users of the shared media device may have previously begun consuming the same content item, using the same copy or different copies and formats. Consumption may have occurred on a personal device, on the current or some other shared media device, or some combination thereof. In addition, each user may have stopped consumption at a different point within the content item, known as a presentation position or a content position.

Upon detection of a single user wishing to use the shared media device to present the content item, a presentation position associated with the user may be accessed and used to present the content from a position within the content substantially near that presentation position. Upon detection of multiple users contending for use of the shared media device, the device (or a management component in communication with the device) may determine which user takes priority or which presentation position to use, of the multiple presentation positions available, to resume presentation of the content item.

Additional aspects of the disclosure relate to the various methods that may be used to determine which user's presentation position to use, if any, when resuming content presentation on the shared media device. For example, when multiple users wish to consume the same content on the same shared media device at the same time, the users may be presented with options to select from, such as using a first user's presentation position, which may be the farthest within the content item, using a second user's presentation position, which may be the earliest within the content item, or using a midpoint between the two. In another example, the farthest position may be used and the users may be presented with a summary of the content that will be skipped. In a further example, some users may have priority over other users, such as a parent that has priority over children. Other examples include random selection of a current content position among those that are available, an average or median of the current content positions available, or a contest among two or more users to decide which current content position to use.

Further aspects of the disclosure relate to determining which content item to present on a shared media device if multiple users, each contending for use of the shared media device at the same time, wish to consume different content items (e.g., the users are associated with presentation positions from different content items rather than the same content item). For example, a first user may be in the process of listening to a particular audio book, while a second user may be listening to a second audio book, or consuming content in some different format altogether. Various methods may be used to determine which content item to resume, including priority among users, presentation of options to the users, and determining which types of content each user is permitted to consume (e.g., some users may not be permitted to watch "R" rated movies or consume other types of content with an equivalent rating).

Although aspects of the embodiments described in the disclosure will focus, for the purpose of illustration, on a management component detecting users and determining which content item or content position to use when resuming presentation, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative example, certain media devices, such as smart televisions and home A/V systems, may be shared among multiple people. Other devices, such as mobile phones and tablet computers, tend to be more personal in nature. When multiple users are consuming a content item separately (or in small groups), the users may each be at different presentation positions within the content at any given time. When two or more users wish to resume consumption of the content item on a shared media device at the same time, the shared media device (or a separate management component) can help determine which of the presentation positions to use.

Generally speaking, a presentation position or content position may refer to any information that reflects a position within a consumed content item at which the user last stopped consuming the content, or to any measurement of an amount of content consumed by a user. For example, a presentation position of an audio book may be indicated by a timestamp, a counter, a chapter, a last spoken word, etc., or any combination thereof. In some embodiments, a position may be reflected as a percentage (e.g., a point representing 25% of the content has been consumed). In other embodiments, a presentation position may be reflected as an absolute value (e.g., at 2 hours, 30 minutes and 5 seconds into an audio book). One skilled in the art will appreciate that a presentation position may be reflected by any combination of the above information, or any additional information reflective of a position of a content. In some embodiments, data regarding the presentation position of the content may reflect the play position at which a device has stopped presenting content or will stop presenting the content.

As an example, a user may begin listening to an audio book version of *The Odyssey* on a shared media device, such as the user's home A/V (audio/video) system (e.g., a stereo or television). The user may stop playback of the audio book at a particular position, such as after 1 hour of elapsed playback time. Later, the user may wish to resume playback of the audio book version of *The Odyssey* on the shared media device. The shared media device, or a management component associated therewith, may automatically detect the user. The management component may use techniques such as voice recognition or facial recognition to detect users, or the management component may establish a connection (e.g., Bluetooth, WiFi, or near-field) with a personal device that is associated with each user. In some cases, the user may provide a user name or pass code, speak a voice command, or otherwise actively identify himself or herself to the management component. Once the user has been detected (e.g., authenticated as a particular user and authorized to use the shared media device), the media device or management component may obtain a presentation position for the user. The presentation position may be stored at the media device or management component and associated with the user through the use of a user account, user identifier, device identifier, etc. In some cases, the presentation position may be obtained from the user's personal device or from a remote service that stores and synchronizes presentation positions across devices. Once the user's presentation position has been accessed, the content may be presented from a position corresponding to or substantially near the user's presentation position.

In some embodiments, the shared media device or a management component associated therewith may also obtain presentation configuration information associated with the user. Presentation configuration information may include font style, audio playback speed, language, and other configuration options that apply to presentation of a content item. The media device may use such configuration information when resuming presentation of the content item.

The user's spouse may also be listening to the audio book version of *The Odyssey*, and may also wish to resume playback on the same home A/V system. The spouse, however, may have most recently stopped playback at a different position than the user, such as after 2 hours of elapsed playback. Rather than simply begin playback at the most recent presentation position or content position associated with the first user to initiate playback, as many shared media devices are configured to do, the home A/V system or the management component can detect that multiple users are in the room. Once the users are identified, the management component may access data associated with each of the multiple users—in this case, the user and the spouse—and determine that they are listening to the same audio book but are associated with different presentation positions. The data may be accessed from a remote device, from the client devices, from a storage component associated with the management component, or some combination thereof.

The management component may employ various methods to determine which of the two different presentation positions, if any, to use when resuming playback. In some embodiments, the user and the spouse may be presented with a choice of presentation positions, such as through visual presentation of a timeline on a television screen. The user and the spouse may vote or agree on which presentation position to use. In some embodiments, the user and the spouse may be given the option to resume playback at the further presentation position (in this case, the spouse at 2 hours elapsed time) and, prior to resuming playback, the management component prepare and present a brief summary of the content between the user's presentation position (1 hour of elapsed time) and the spouse's presentation position (2 hours of elapsed time). In additional embodiments, the spouse may have priority over the user (or vice-versa) according to some predetermined or dynamically determined rule. In further embodiments, a virtual coin flip or some other random choice may be made, or the users may be prompted to compete for the right to choose the presentation position. Other methods of selecting a presentation position from among multiple different presentation positions associated with multiple users are described in detail below.

Once a presentation position has been selected, the management component may initiate playback of the audio book on the home A/V system from the selected presentation position. Other users may enter the room, such as the children, other family members, or friends of the user and the spouse. In such cases, the process of identifying a presentation position may be repeated, may be overridden by the current user and/or spouse, or playback of the content item may be stopped due to various "spoiler"-related or content-rating-related considerations.

In some embodiments, users without presentation positions for the content item may be detected. In such cases, those users may be presented with the opportunity to purchase the content item. For example, if a friend without a current content position for *The Odyssey* is detected during playback, a message may be sent to the friend giving the fried the opportunity to purchase *The Odyssey* audio book so that the user may resume listening to the audio book on the user's own.

Features disclosed here for determining which presentation position among two or more presentation positions associated with the same content item may also be used to select a content item for presentation. For example, if a user and a spouse wish to resume presentation of different content items that each was previously consuming, the users may be presented with options and other resolution techniques as mentioned above and described in detail herein.

Networked Content Consumption Environment

Figure 1:
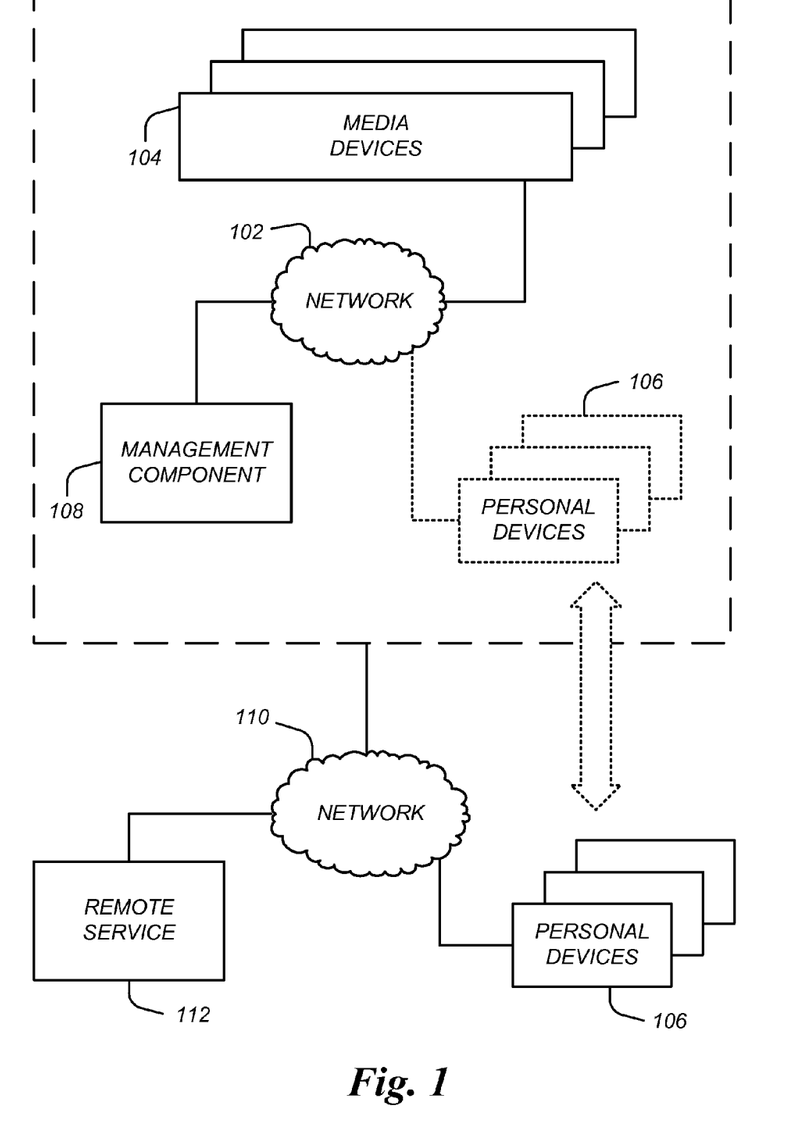
FIG. 1 is a block diagram of an illustrative networked content consumption environment including a local area network, a remote service, and multiple personal devices in communication over a network.

Prior to describing embodiments of the automated transition process in detail, an example networked content consumption environment in which the process may be implemented will be described. FIG. 1 illustrates a networked content consumption environment including a network, such as local area network (LAN) 102, any number of personal devices 106, and a remote service 112. The LAN 102 may include one or more switches, routers, cable modems, ADSL modems, etc. The personal devices 106 and remote service 112 may communicate with each other and with the LAN 102 over a communication network 110. The communication network 110 may be a publicly accessible network of linked networks, possibly operated by various distinct parties, such as the Internet. In some embodiments, the communication network 110 may be a private or semi private network, such as a corporate or university intranet. The communication network 110 may include one or more wireless networks, such as a GSM network, a CDMA network, an LTE network, or other type of wireless network.

The personal devices 106 can correspond to a wide variety of electronic devices. In some embodiments, the personal devices 106 are mobile devices that include one or more processors and a memory which may contain software applications executed by the processors. In addition, the personal devices 106 may include speakers and/or displays for presenting content. Illustratively, the personal devices 106 may include mobile phones, personal digital assistants (PDAs), mobile gaming devices, media players, electronic book readers, tablet computers, laptop computers, and the like. The software of the personal devices 106 may include components for establishing communications over networks 102, 110. In addition, the software applications may include multimedia applications which play or otherwise execute audio programs such as music or audio books, video programs such as movies or television shows, and video games.

The LAN 102 may connect to any number of media devices 104, personal devices 106, and a management component 108 in communication via a wireless link, such as a WiFi link. In such cases, the LAN 102 may be or include a wireless local area network (WLAN). Additionally, the LAN 102 may connect to the network 110, facilitating communication between various devices and components communicating over the LAN 102 and the devices and components connected to the network 110, such as the remote service 112 and other personal devices 106. In some embodiments, the components networked to the LAN 102 may communicate over a combination of wired and wireless communication links. For example, the LAN 102 may be networked to a management component 108 (which may be a single management component or may include multiple management components) in communication with several media devices 104 via a wired communication link, such as an Ethernet connection. Due to the mobile nature and wireless connectivity of many personal devices 106, the LAN 102 may network any number of personal devices 106, and the number may change over time or from minute to minute. Personal devices 106 may communicate with the management component 108 via a WiFi connection.

In some embodiments, personal devices may communicate with the management component 108 or media devices 104 via a personal area network (PAN), Bluetooth connection, or some other near-field communication link. In some embodiments the LAN 102 may be replaced by such connections. For example, a home A/V system may include an integrated management component 108 capable of communicating directly with a personal device 106 over near-field communication link without the need for a router, access point, or other components typically used in a LAN 102.

The media devices 104 can correspond to a wide variety of electronic devices. In some embodiments, the media devices 104 can include audio or visual output components, such as speakers or video screens. For example, the media devices 104 may include televisions, stereos, digital video recorders (DVRs), set-top boxes, desktop computers, server computers, and the like. In some embodiments, a media device 104 may also be a personal device 106, such as a mobile media player that is optionally connected to speakers or a stereo. Some media devices 104 may include one or more processors and a storage or memory which may contain software applications executed by the processors. The software of the media devices 104 may include components for establishing communications over the LAN 102 and network 110. In addition, the software applications may include multimedia applications which play or otherwise execute audio programs such as music or audio books, video programs such as movies or television shows, and video games. The storage of the media devices 104 may also contain copies of content to play on the speakers or video screens. The media devices 104 may be configured to receive and/or transmit streaming media (e.g., audio and/or video content).

The management component 108 illustrated in FIG. 1 may correspond to a computing device configured to manage content consumption among the media devices 104 and personal devices 106. For example, the management component 108 may include one or more processors and a computer storage or memory which contains software applications executed by the processors. The services provided by the management component 108 can include detecting the presence of personal devices 106, determining which content items are being consumed by users associated with the personal devices 106, which presentation positions the users are at within the content items, and the like. In some embodiments, the management component 108 may be coupled to or integrated into a media device 104. For example, a smart television or set-top box may include a combination of software and hardware which provide the services of the management component 108.

The remote service 112 illustrated in FIG. 1 may correspond to a logical association of one or more computing devices configured to receive information from the personal devices 106 and distribute the information to various LANs 102 and components coupled thereto. For example, the remote service 112 may communicate with the personal devices 106 via the communication network 110. The personal devices 106 may send and receive data regarding content consumption, such as presentation positions and the like. In addition, the remote service 112 can communicate with the management component 108 and/or the media devices 104 via the communication network 110 and the LAN 102. The management component 108 or media devices 104 may receive data regarding content consumption associated with a particular user or device in order to resume presentation from a presentation position. The media devices 104 or management component 108 may also submit data to the remote service 112 regarding presentation positions reached on the media devices 104 so that users may resume presentation from the presentation position at a later time, from a different media device 104 or from a personal device 106, etc.

Optionally, the remote service 112 incorporates the functionality of the management component 108 so that the user does not have to employ user equipment to host the management component 108. In other embodiments, the remote service 112 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the networked content consumption environment may include additional or fewer components that those illustrated in FIG. 1. For example, the networked content consumption environment may include additional LANs 102 which personal devices 106 may or may not join in addition to the LAN 102 illustrated in FIG. 1. In another example, the networked content consumption environment may not include a remote service 112. In such a case, the management component 108 of the LAN 102 may collect information from the personal devices 106 in a manner similar to the remote service 112.

Figure 2:
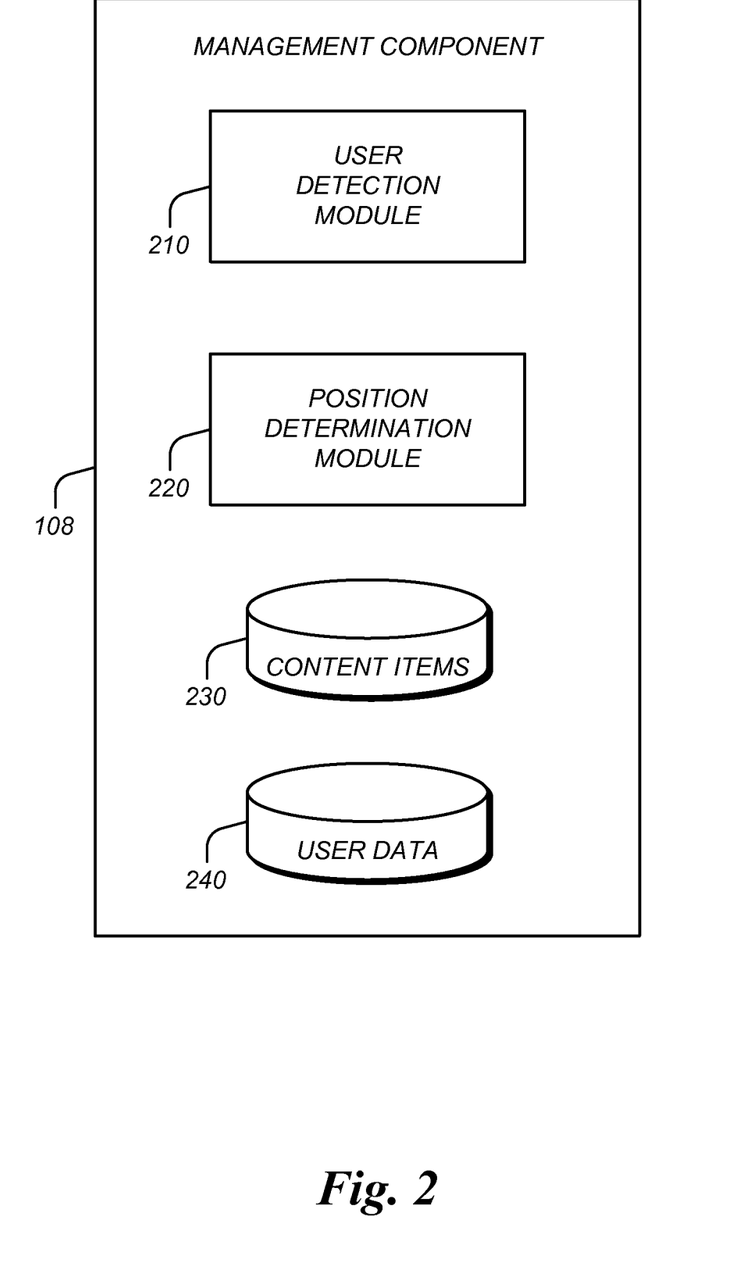
FIG. 2 is a block diagram of an illustrative management component for managing use of shared content consumption devices.

FIG. 2 illustrates one embodiment of a management component 108. The management component 108 of FIG. 2 includes a user detection module 210, a position determination module 220, a content data store 230, and a user data store 240. In some embodiments, the management component may include additional or fewer modules or data stores. For example, while the position determination module 220 manages the process of determining which presentation position to use when initiating content presentation, the management component 108 may include a content determination module in addition to or instead of a position determination module 220. Such a content determination module may manage the process of determining which content item to present in cases where multiple users wish to use a shared media device 104 to present different content items.

The user detection module 210 may monitor network activity, input devices, and other communication channels to detect the presence of various users or devices. For example, the user detection module 210 may include a voice recognition module that recognizes users by the sound of their voices, or a speech recognition module that receives speech input such as a user name, password, or other voice command that may identify a user. As another example, the user detection module 210 may use a camera or some other visual input component to receive images of users and perform facial recognition to detect a particular user. As a further example, the user detection module 210 may obtain data from a personal device 106 associated with a user when the personal device 106 connects to a network that the management component 108 is also connected to, such as the LAN 110 of FIG. 1. Alternatively, the personal device 106 may establish a connection with the management component 108 directly, such as a Bluetooth or other near-field wireless connection. The personal device 106 may transmit a token or other identifier that corresponds to the personal device 106 or the user. Input initiated by the user through a keyboard, remote control, touch screen, biometric sensor, or some other input device may also be used by the detection module 210 to detect individual users.

The user detection module 210 may access a user data store 240 during the user detection process. For example, passwords and other security data may be verified against data in the user data store 240. Data regarding the personal devices 106 that a user is associated with may be accessed in order to detect a particular user. In some embodiments, the user detection module 210 may access user data from a remote service 112 instead of or in addition to a user data store 240 associated with the management component 106.

The position determination module 220 may obtain presentation position data associated with a user. For example, after a user has been detected by the user detection module 210, the position determination module 220 may obtain presentation positions from the user data store 240, a remote service 112, a personal device 106, etc. When multiple users have been detected and wish to initiate presentation of a particular content item, the position determination module 220 can perform processing to determine which presentation position to use when initiating presentation. For example, the position determination module 220 may determine whether one user has priority over another user, or it may prompt the users to select a presentation position. Additional techniques for selecting a presentation position from multiple available presentation positions are described below.

The content items data store 230 may store content items for presentation by the management component 108 or a media device 104 associated with the management component 108. For example, the content items data store 230 may store audio books, movies, television shows, games, and other electronic content which may be presented on a media device 104 or a personal device 106. Upon initiation of content presentation, the management component 108 may transmit a content file to a media device 104 or personal device 106. Alternatively, the content item may be streamed to the media device 104 or personal device 106. In some embodiments, a content item may not be stored in a separate data store associated with the management component 108, but rather the content item may be streamed from a remote service 112 or stored on a media device 104 or personal device 106.

Process for Managing a Shared Content Consumption Device

Figure 3:
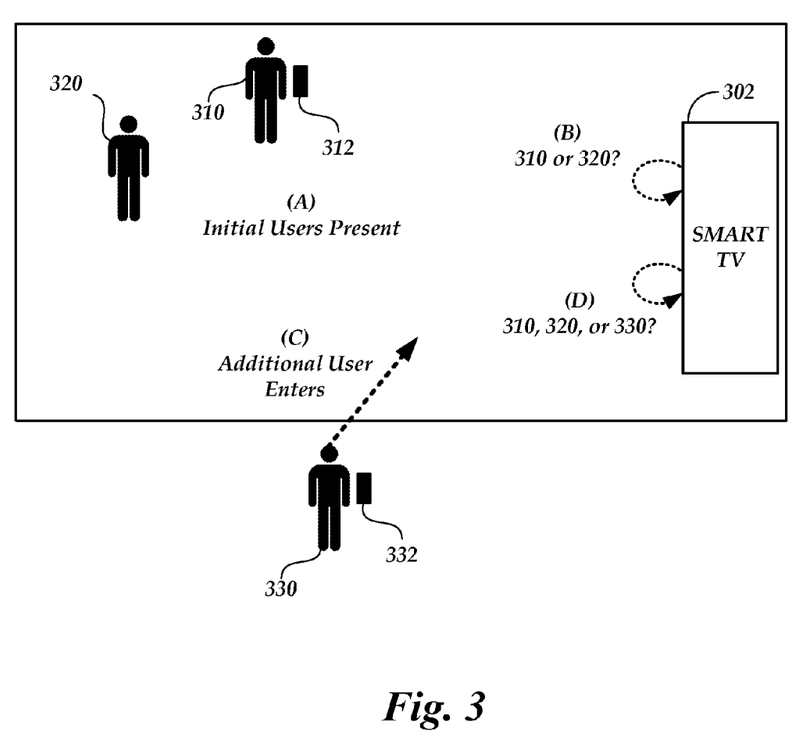
FIG. 3 is a block diagram of illustrative interactions between a media device/management component and various users, as might occur when one or more users wish to initiate playback of a content item.

Turning now to FIG. 3, sample user interactions and presentation position determinations will be described. FIG. 3 illustrates a house, office, or some other area that may include media devices capable of being shared among multiple users. Media device 302 is a smart television (smart TV) that may include both audio and visual outputs. In some cases, media device 302 may instead be a stereo configured to output audio. The media devices 302 described below is illustrative only, and not intended to be limiting. Other media devices may be substituted or added, as described herein.

At (A), users 310 and 320 are initially present in a room with a smart TV 302. The smart TV 302 may include hardware and software that implement the features of a management component 108, as described herein. User 310 may be carrying a mobile phone 312 or some other personal device, and the smart TV 302 may detect the user through near-field communication with the device 312. User 320 may be detected by the smart TV 302 through voice recognition, entry of a user name and/or password into the smart TV 302, etc. Both users 310, 320 may wish to initiate presentation of a content item on the smart TV 302, such as a television program. Each of the users 310, 320 may be associated with a different presentation position for the television program.

For example, user 310 may have last stopped viewing the program during episode 3, while user 320 may have last stopped viewing the program during episode 5.

At (B), the smart TV 302 may initiate a process for determining which presentation position to use when initiating playback of the television program. As described in detail below, the smart TV 302 may determine that one user has priority over the other user (e.g., user 310 is a parent and has priority over a child 320). As another example, the smart TV 302 may present the users with an interface for selecting which presentation position to use. In some embodiments, the users may have the option of being presented with a summary of what one user would miss if it is determined that the later presentation position will be used. For example, user 310 may decide to skip ahead to episode 5 so that the users 310, 320 may watch the television show together without requiring user 320 to re-watch episode 4. A summary or digest of what user 310 will miss by resuming at episode 5 (e.g., the end of the episode 3 and the entirety of episode 4) may be presented prior to resuming at episode 5. Other techniques may be used to determine which presentation position to use, as described in detail below.

At (C), a third user 330 may enter the area be detected by the smart TV. The third user 330 may also be associated with a presentation position for the television show, and a process similar to that described above with respect to (B) may be performed at (D) to select a presentation position from among all users 310, 320, 330. In some cases, though, the user 330 may not have a presentation position for the current television show. For example, the user may be a spouse of user 310, or the user 330 may be some other user that typically shares the smart TV 302. The user 330 may not have begun watching the television show but may, however, be associated with presentation positions for other content items. In such cases, the smart TV can perform a process at (D) for determining which content item to present among the various content items for which the users 310, 320, 330 have presentation positions.

As another example, the user 330 may be a friend of one of the users 310, 320 and may not have begun watching the television show. However, the user 330 may be detected by the smart TV 302 through communications with the user's 330 mobile phone 332 or other personal device. A token or other identifier may be obtained, and a remote service 112 may be contacted to identify the user. If the user 330 stays and watches the television show, a current content position may be saved for the user 330 at the smart TV 302, the user's 330 personal device 332, or at the remote service 112. In addition, an offer may be made to the user 330 such that the user 330 may easily purchase or otherwise access the content item at a later time, even without using the same smart TV 302 or being with the other users 310, 320. For example, the content item may be automatically added to an online shopping cart of an account associated with the user 330 so that the user 330 may see the content item the next time the user 330 shops online.

Figure 4:
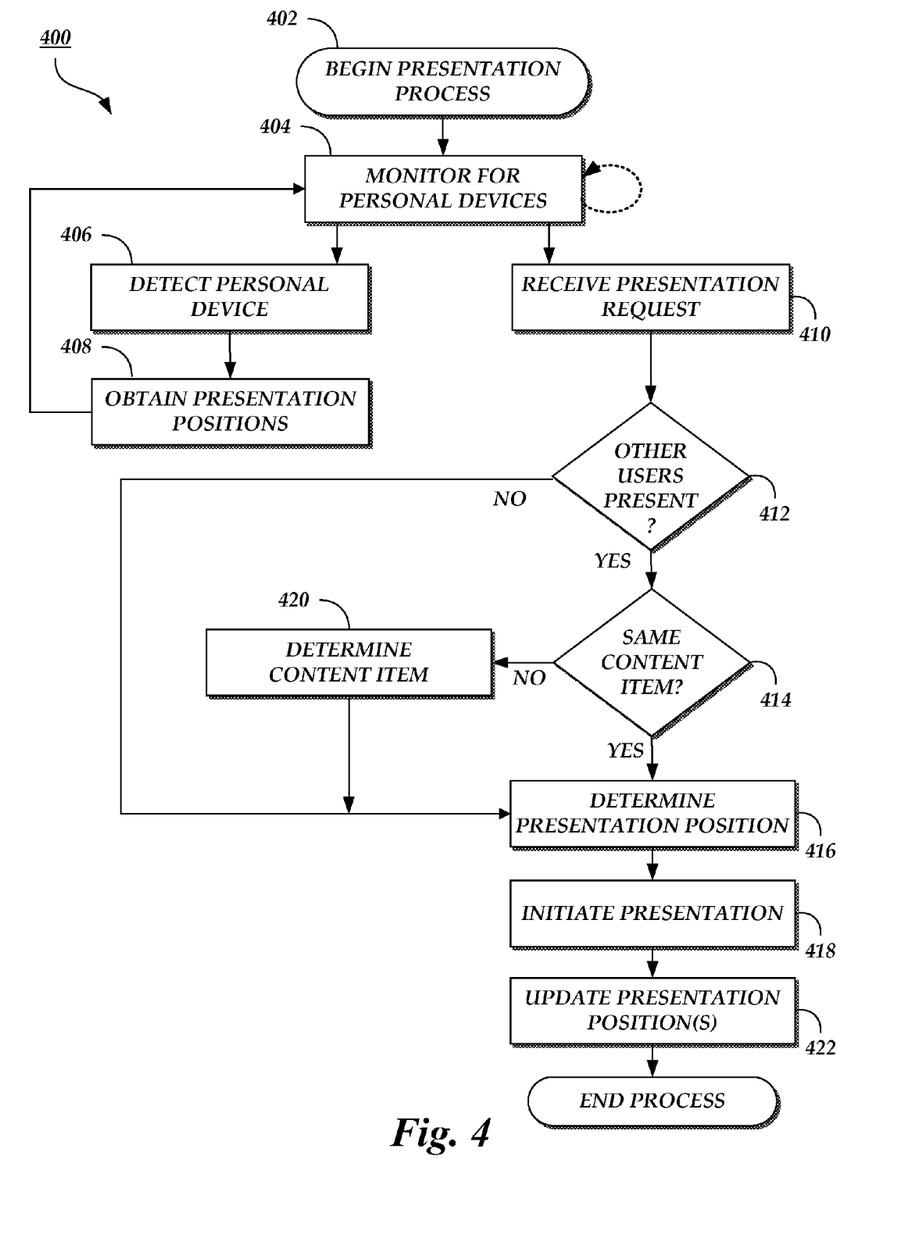
FIG. 4 is a flow diagram of an illustrative process for detecting users, determining content items and presentation positions, and initiate presentation of content.

FIG. 4 illustrates a process 400 that may be used to detect users and determine which presentation position to use when presenting content to multiple users, or which content item to present to users who may not each have a presentation position with a common content item (e.g., there may not be any content item for which each of the users has a presentation position). Advantageously, the process 400 may be automatically performed by a management component 108 or shared media device 104 when multiple users are detected, thereby avoiding a time-consuming process wherein each user manually determines which content items the user is in the process of consuming and specific presentation positions for each of the content items.

The process 400 begins at block 402. For example, if the process 400 is implemented by a management component or a shared media device 104, the process may begin automatically upon power up or it may be manually initiated. The process 400 may be embodied in a set of executable program instructions stored on a computer-readable medium, such as one or more disk drives, of a computing system with which a management component 108 or a media device 104 is associated. When the process 400 is initiated, the executable program instructions can be loaded into memory, such as RAM, and executed by one or more processors of the computing system. In some embodiments, the computing system may include multiple computing devices, such as servers, and the processes may be executed by multiple servers, serially or in parallel.

At block 404, the user detection module 210 or some other component of the management component 108 or shared media device 104 may monitor one or more input channels for data indicative of a user's presence. For example, microphones for voice recognition may be activated, network communications may be monitored, a graphical user interface may be presented, etc.

At block 406, the user detection module 210 detects the presence of a user. As described herein, a user may be detected in any number of ways, including speech/voice recognition, facial recognition, personal device 106 communications, user input via keyboards and other input devices, and the like. A user data store 240 may be accessed to authenticate and authorize a user based on user account information contained therein. In some embodiments, the user detection module 210 may communicate with a remote service 112 to authenticate a particular user.

At block 408, presentation positions associated with the user may be obtained. The presentation positions may be stored at a remote service 112, at the user's personal device 106, at a media device 104, at the management component 108, or some combination thereof. A user may be uniquely associated with an account, such that a user may only be associated with a single account, and an account may only be associated with a single user. The user may have any number of devices associated with the account such that the user may consume content on each of the devices and access the same presentation position on each device. In some cases, an account may be associated with multiple users. In such cases, a set of presentation positions may be separately maintained for each user or each device. In this way, one account may be associated with multiple distinct current presentations for a single content item. Once a user has been detected and current content position data has been accessed for the user, the process 400 may return to block 404, where the management component 108 monitors for input and other notifications.

In some embodiments, current content positions are not accessed upon user detection, but instead are only accessed after a request to present a content item has been received. In some embodiments, a user is not proactively detected, but rather the user is authenticated when the user makes a request to present a content item.

At block 410, the management component 108 receives a request from a user to present content item. For example, a user may wish to initiate presentation of an audio book at the user's presentation position. At decision block 412, the management component 108 determines whether other users have been detected (e.g., other users are present and may also consume content). If no other user is present or has been detected, then the process may proceed to block 418 where the content is presented from a point substantially near the user's presentation position for the content item. If other users are present or have been detected, the process 400 proceeds to decision block 414.

At decision block 414, the management component 108 determines whether the multiple users (e.g., the user that initiated the request at 410 and any additional users determined to be present at decision block 412) are each associated with a presentation position for the content item of which user requested presentation at block 410. If each of the users is associated with a current content position for the content item, the process 400 proceeds to block 416. Otherwise, the process 400 proceeds to block 420.

Figure 5:
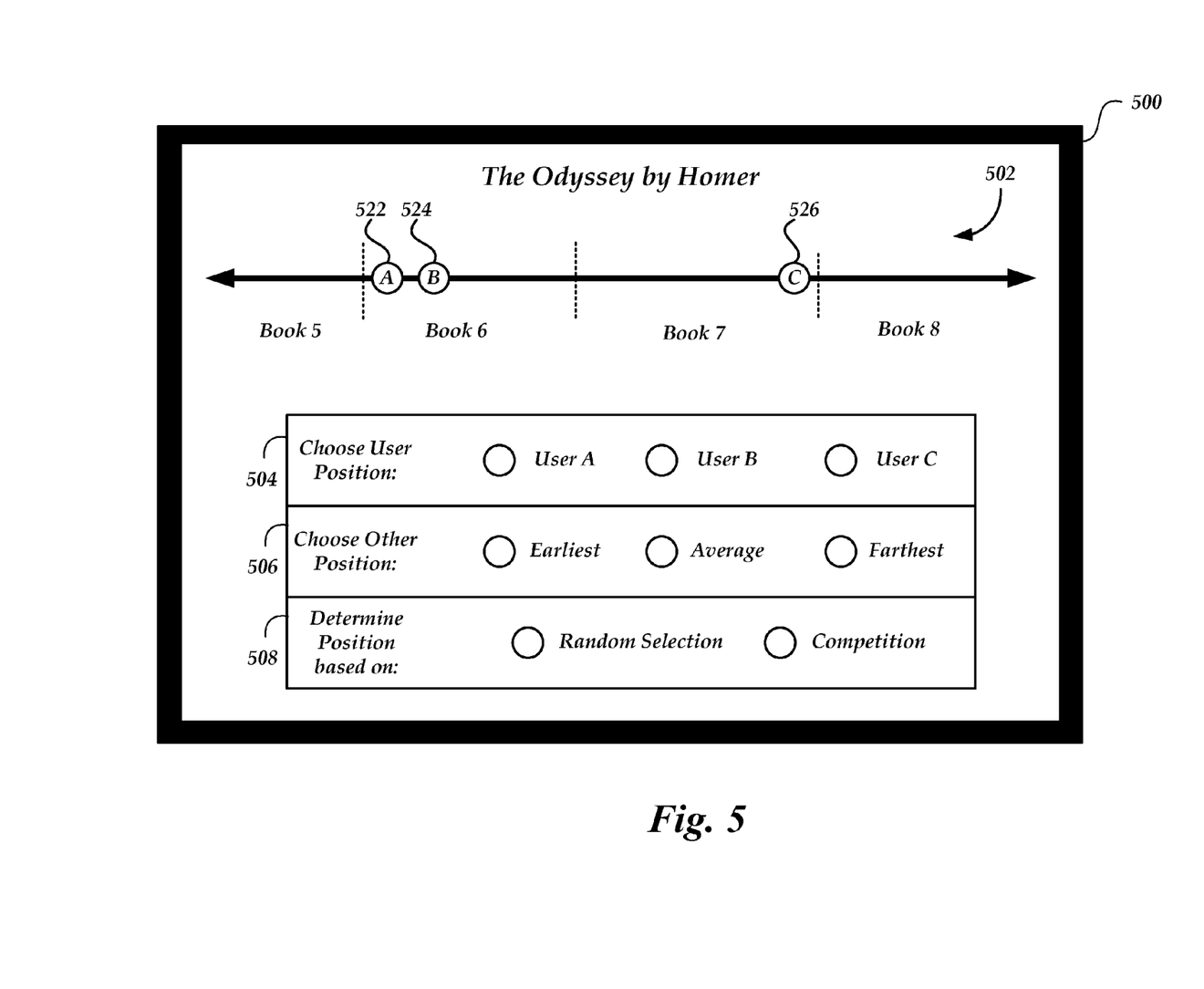
FIG. 5 is user interface diagram of an illustrative user interface presenting options for determining a presentation position to use when initiating content consumption.

At block 416, the position determination module 220 determines which presentation position to use when initiating presentation of the requested content item. Various techniques may be used to determine a presentation position. For example, the users may be prompted to choose which presentation position to use, or to indicate an alternative presentation position such as an average or median presentation position. FIG. 5 illustrates an interface which may be presented to the users for this purpose.

The user interface 500 of FIG. 5 can include a timeline 502 representing the content item or some portion thereof. User indicators 522, 524, 526 may be positioned on the timeline 502 at points corresponding to the presentation position associated with each user. In this way, the users may visualize where each presentation position is in relation to the others and to the content as a whole. The users may be prompted to choose a particular presentation position. For example, input control 504 may list options corresponding to each user. An option may be activated via touch screen input, remote control, keyboard, video game controller input, and the like. In some cases, users may indicate a choice verbally, and the management component 108 or media device 104 may be configured to translate the voice command into a selection of a particular presentation position.

Additional options may be presented to the users. For example, the various presentation position options may be described with respect to each other rather than with respect to their corresponding users. Input control 506 illustrates one embodiment of this concept. Options include using the earliest presentation position (e.g., the one closest to the beginning of the content item), the average or median presentation position, and the farthest presentation position (e.g., the one closest to the end of the content item). Additional options may be presented, such as using the farthest presentation position and also generating a summary of some or all of the content that will be skipped by the other users.

In some embodiments, a presentation position may be determined through means other than user selection. For example, a presentation position may be chosen randomly, akin to a virtual coin flip. If users desire more control over the determination, a vote, contest or game may be conducted. For example, brief games such as rock paper scissors, tic tac toe, and the like may be used. In some embodiments, users may use video game controllers or their personal devices 106 as input during the games.

Rather than letting users select, compete for, or otherwise interactively control the determination of a presentation position, rules may be defined to automatically determine a presentation position. For example, users may be ranked in order, and the presentation position associated with the highest ranking user may be used. Alternatively, rather than each user being associated with a rank, certain users may have priority over other users or groups of users.

In response to the determination of a content item, the process 400 may proceed to block 418, where the content is presented from a position substantially near the determined presentation position.

If users not associated with a presentation position for the requested content item are present, the process proceeds to block 420 where the management component 108 determines a content item to present. User data may be accessed for each user present, and a list of potential content items may be determined. For example, options corresponding to several content items which seem to be the most popular among the present users, or the most popular among the general public, may be provided. Users may access a user interface similar to the user interface 500 described above to choose a content item. User rank or priority may also be considered, in a process similar to that described above.

In some embodiments, the nature of the content itself may be considered. For example, content items may be associated with ratings of the appropriateness of the content to various audiences, such as the letter-based ratings used for motion pictures. An audio book with explicit language may be given the equivalent of an "R" rating. The management component 108, remote system 112, or user devices 106 may keep a profile of each user, including which content ratings each user may access or be exposed to. If the user profile associated with a user specifies that the user may not access or be exposed to content with "R" ratings, then "R" rated content can automatically be excluded from the options given to the users.

Once a content item is agreed on, voted on, selected, or otherwise determined, the content item is presented. If one or more users have presentation positions associated with the content item, the process 400 may move to block 416 where a presentation position is determined. In some cases, only one user is associated with a presentation position for the content item, and that presentation position is used by default. In some cases, the content item may be presented from the beginning.

At block 422, presentation positions are updated for the users consuming the content item. Presentation positions may be updated during and/or after a content consumption session. As described above, the presentation position may be stored at the management component 108, at the media device 104, at a remote service 112, at personal devices 106, or some combination thereof. Therefore, the manage component 108 or the media device 104 on which the content was being presentenced may determine the position at which presentation halted, and transmit data regarding the presentation position to the appropriate devices for storage. In some embodiments, a presentation position may be saved and associated with the group of users present instead of or in addition to saving a position for each individual user.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for managing a shared media device, the system comprising:
   a data store configured to store computer-executable instructions; and
   a computing device in communication with the data store, the computing device, when executing the computer-executable instructions, configured to:
   detect a first user of a plurality of users associated with the shared media device within a proximity of the shared media device;
   detect that a second user of the plurality of users is within the proximity of the shared media device concurrently with the first user;
   receive a request to present an audio book;
   determine a presentation position from which to initiate presentation of the audio book based at least partly on an earlier of a first presentation position for the audio book associated with the first user and a second presentation position for the audio book associated with the second user; and
   cause the shared media device to present the audio book from the presentation position that is determined.

2. The system of claim 1, wherein the shared media device comprises the computing device.

3. The system of claim 1, wherein detecting the first user comprises establishing wireless communications with a personal device of the first user.

4. The system of claim 1, wherein detecting the first user comprises performing voice recognition, speech recognition, or facial recognition.

5. The system of claim 1, wherein the computing device is further configured to at least:
   receive, from a first device associated with the first user, the first presentation position for the audiobook;
   receive, from a second device associated with the second user, the second presentation position for the audiobook;
   receive a selection of a selected option of a plurality of options, wherein the plurality of options comprises a first option corresponding to the earlier of the first presentation position and the second presentation position, a second option corresponding to a later of the first presentation position and the second presentation position, and a third option corresponding to an average of the first presentation position and the second presentation position; and
   determine that the selected option corresponds to the earlier of the first presentation position and the second presentation position,
   wherein determining the presentation position based at least partly on the earlier of the first presentation position and the second presentation position is performed in response to determining that the selected option corresponds to the earlier of the first presentation position and the second presentation position.

6. A computer-implemented method for managing use of a shared media device, the computer-implemented method comprising:
   under control of one or more computing devices configured with specific computer-executable instructions,
   detecting a first user and a second user, wherein both the first user and the second user are concurrently within a range of a shared media device, and wherein the first user and the second user are associated with the shared media device;

determining a content position within a content item from which to initiate presentation of the content item, the content position determined using a first user content position for the content item associated with the first user and a second user content position for the content item associated with the second user; and causing the shared media device to initiate presentation of the content item from the content position within the content item.

7. The computer-implemented method of claim 6 wherein the content item comprises an audio book, a video, a video game, a music file, or a multimedia file.

8. The computer-implemented method of claim 6, wherein detecting the first user and the second user comprises performing, with respect to at least one of the first user and the second user, voice recognition, speech recognition, or facial recognition.

9. The computer-implemented method of claim 6, wherein detecting the first user and the second user comprises establishing a connection with a personal device, associated with at least one of the first user and the second user, over a wireless local area network.

10. The computer-implemented method of claim 6, wherein detecting the first user and the second user comprises establishing a near-field wireless connection with a personal device associated with at least one of the first user and the second user.

11. The computer-implemented method of claim 10, wherein the personal device comprises at least one of a mobile phone, media player, tablet computer, or laptop computer.

12. The computer-implemented method of claim 6 further comprising:

obtaining the first user content position from a personal device associated with the first user.

13. The computer-implemented method of claim 6 further comprising:

obtaining the first user content position from a remote system, wherein the first user is associated with an account with the remote system.

14. The computer-implemented method of claim 6 further comprising:

obtaining the first user content position from a data store associated with the one or more computing devices.

15. The computer-implemented method of claim 6, wherein determining the content position within the content item from which to initiate presentation of the content item using the first user content position and the second user content position comprises:

presenting a plurality of options, wherein the plurality of options comprises the first user content position and the second user content position; and receiving a selection of at least one of the plurality of options.

16. The computer-implemented method of claim 15, wherein the plurality of options further comprises a generated content position between the first user content position and the second user content position.

17. The computer-implemented method of claim 15, wherein the plurality of options further comprises a generated content position based at least in part on output from a random number generator.

18. The computer-implemented method of claim 6, wherein determining the content position within the content item from which to initiate presentation of the content item using the first user content position and the second user content position comprises generating a content position between the first user content position and the second user content position.

19. The computer-implemented method of claim 6, further comprising presenting a summary of a portion of the content item between the first content position and the second content position.

20. The computer-implemented method of claim 6, further comprising:

detecting a third user within the range of the shared media device, the third user not previously associated with the shared media device; and causing a content sale offer to be generated to the third user, wherein the content sale offer comprises an offer to sell the content item to the third user.

21. A non-transitory computer readable medium comprising executable code that, when executed by a processor, causes a computing device to perform a process comprising:

detecting a first user and a second user concurrently within a range of a shared media device, wherein the first user and the second user are associated with the shared media device, wherein the first user is associated with a first user content position within a first content item, and wherein the second user is associated with a second user content position within a second content item different than the first content item;

selecting, from among the first content item and the second content item, the first content item to be presented using the shared media device, wherein the first content item is selected using information regarding the first content item and information regarding the second content item; and causing the shared media device to initiate presentation of the first content item from the first user content position.

22. The non-transitory computer readable medium of claim 21, wherein the first content item comprises an audio book, a video, a video game, a music file, or a multimedia file.

23. The non-transitory computer readable medium of claim 21, wherein selecting the first content item using information regarding the first content item and information regarding the second content item comprises:

using information regarding the first content item and information regarding the second content item to present a plurality of options, wherein the plurality of options comprises a first option corresponding to the first content item and a second option corresponding to the second content item;

receiving a selection of the first option; and selecting the first content item based at least partly on the selection of the first option.

24. The non-transitory computer readable medium of claim 21, wherein the information regarding the first content item comprises a content rating of the first content item, and wherein the information regarding the second content item comprises a content rating of the second content item obtaining data regarding a content rating associated with a second content item, wherein the second user is associated with a user content position within the second content item; and determining that the first user not permitted to consume content items associated with the content rating.

25. The non-transitory computer readable medium of claim 21, wherein the process further comprises determining that the first user has priority over the second user, wherein selecting the first content item using information regarding the first content item and information regarding the second content item is based at least in part on the determination that the first user has priority over the second user.

26. The non-transitory computer readable medium of claim 21, wherein selecting the first content item using information regarding the first content item and information regarding the second content item comprises:

determining, using the information regarding the first content item and the information regarding the second content item, that the first content item is selected more often than the second content item; and selecting the first content item based at least partly on determining that the first content item is selected more often than the second content item.

27. The non-transitory computer readable medium of claim 21, wherein detecting the first user and the second user comprises performing, with respect to at least one of the first user and the second user, voice recognition, speech recognition, or facial recognition.

28. The non-transitory computer readable medium of claim 21, wherein detecting the first user and the second user comprises establishing a connection with a personal device, associated with at least one of the first user and the second user, over a wireless local area network.

29. The non-transitory computer readable medium of claim 21, wherein detecting the first user and the second user comprises establishing a near-field wireless connection with a personal device associated with at least one of the first user and the second user.

30. The non-transitory computer readable medium of claim 29, wherein the personal device comprises at least one of a mobile phone, media player, tablet computer, or laptop computer.

* * * * *